(12) United States Patent
Lavoie

(10) Patent No.: US 10,585,430 B2
(45) Date of Patent: Mar. 10, 2020

(54) REMOTE PARK-ASSIST AUTHENTICATION FOR VEHICLES

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 301 days.

(21) Appl. No.: 15/626,024

(22) Filed: Jun. 16, 2017

(65) Prior Publication Data

US 2018/0364696 A1    Dec. 20, 2018

(51) Int. Cl.
| | |
|---|---|
| *G05D 1/00* | (2006.01) |
| *B60W 30/06* | (2006.01) |
| *B60K 35/00* | (2006.01) |
| *B60R 25/23* | (2013.01) |
| *B60R 25/25* | (2013.01) |
| *B62D 15/02* | (2006.01) |

(52) U.S. Cl.
CPC ........... *G05D 1/0016* (2013.01); *B60K 35/00* (2013.01); *B60R 25/23* (2013.01); *B60R 25/25* (2013.01); *B60W 30/06* (2013.01); *B62D 15/0285* (2013.01); *B60K 2370/173* (2019.05); *B60K 2370/175* (2019.05); *B60K 2370/334* (2019.05); *B60K 2370/52* (2019.05); *B60K 2370/56* (2019.05); *B60K 2370/566* (2019.05); *B60K 2370/573* (2019.05); *B60K 2370/589* (2019.05)

(58) Field of Classification Search
None
See application file for complete search history.

(56) References Cited

U.S. PATENT DOCUMENTS

| 5,959,724 A | 9/1999 | Izumi |
| 6,275,754 B1 | 8/2001 | Shimizu |
| 6,356,828 B1 | 3/2002 | Shimizu |

(Continued)

FOREIGN PATENT DOCUMENTS

| CN | 101929921 A | 12/2010 |
| CN | 103818204 A | 5/2014 |
| CN | 104183153 A | 12/2014 |
| CN | 104485013 A | 4/2015 |

(Continued)

OTHER PUBLICATIONS

US 9,772,406 B2, 09/2017, Liu (withdrawn)

(Continued)

*Primary Examiner* — Dale W Hilgendorf
*Assistant Examiner* — Alexander Connor Larkin Bost
(74) *Attorney, Agent, or Firm* — Frank Lollo; Eversheds Sutherland (US) LLP

(57) ABSTRACT

Method and apparatus are disclosed for remote park-assist authentication for vehicles. An example vehicle includes an autonomy unit to control motive functions for remote parking, a communication module to receive a signal for remote parking from a mobile device, and a parking authenticator. The parking authenticator is to present an image upon receiving the signal and receive, via the communication module, an audio identification from the mobile device. Also, the parking authenticator is to authenticate the mobile device to initiate remote parking in response to determining the audio identification corresponds to the image.

19 Claims, 4 Drawing Sheets

(56) References Cited

U.S. PATENT DOCUMENTS

| | | |
|---|---|---|
| 6,452,617 B1 | 9/2002 | Bates |
| 6,476,730 B2 | 11/2002 | Kakinami |
| 6,477,260 B1 | 11/2002 | Shimomura |
| 6,657,555 B2 | 12/2003 | Shimizu |
| 6,683,539 B2 | 1/2004 | Trajkovic |
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1* | 11/2017 | Hayes ................. G08G 1/0112 |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2* | 4/2019 | Farges ................... G06F 21/32 |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |

(56) References Cited

U.S. PATENT DOCUMENTS

| | | |
|---|---|---|
| 2010/0136944 A1 | 6/2010 | Taylor |
| 2010/0152972 A1 | 6/2010 | Attard |
| 2010/0156672 A1 | 6/2010 | Yoo |
| 2010/0245277 A1 | 9/2010 | Nakao |
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich et al. |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0099892 A1* | 4/2013 | Tucker ............... G07C 9/00309 340/5.61 |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar et al. |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1 | 8/2014 | Matters et al. |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita et al. |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1* | 12/2015 | Brown ............... H04L 63/0838 726/7 |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet et al. |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman et al. |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang et al. |
| 2017/0001650 A1 | 1/2017 | Park |
| 2017/0008563 A1 | 1/2017 | Popken et al. |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1* | 4/2017 | Takamatsu ............. B60K 35/00 |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |

(56) References Cited

U.S. PATENT DOCUMENTS

| | | |
|---|---|---|
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |
| 2017/0208438 A1 | 7/2017 | Dickow |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0336788 A1 | 11/2017 | Iagnemma |
| 2017/0353555 A1* | 12/2017 | Lauer ............... H04W 12/08 |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1* | 3/2018 | Donald ............... G05D 1/0246 |
| 2018/0082588 A1* | 3/2018 | Hoffman, Jr. ......... G08G 1/166 |
| 2018/0088330 A1 | 3/2018 | Giannuzzi |
| 2018/0093663 A1* | 4/2018 | Kim ............... G08G 1/165 |
| 2018/0105165 A1 | 4/2018 | Alarcon |
| 2018/0105167 A1* | 4/2018 | Kim ............... B60W 30/06 |
| 2018/0148094 A1 | 5/2018 | Mukaiyama |
| 2018/0164798 A1* | 6/2018 | Poeppel ............... G05D 1/0016 |
| 2018/0174460 A1* | 6/2018 | Jung ............... G08G 1/005 |
| 2018/0182183 A1* | 6/2018 | Mrowczynski ........ G08C 17/02 |
| 2018/0189971 A1 | 7/2018 | Hildreth |
| 2018/0194344 A1 | 7/2018 | Wang |
| 2018/0196963 A1* | 7/2018 | Bandiwdekar ...... G06F 21/6245 |
| 2018/0201226 A1* | 7/2018 | Falkson ............... B60R 25/257 |
| 2018/0224863 A1 | 8/2018 | Fu |
| 2018/0236957 A1 | 8/2018 | Min |
| 2018/0284802 A1 | 10/2018 | Tsai |
| 2018/0286072 A1 | 10/2018 | Tsai |
| 2018/0339654 A1* | 11/2018 | Kim ............... B60Q 9/002 |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |
| 2019/0299933 A1* | 10/2019 | Suzuki ............... B60R 25/305 |

FOREIGN PATENT DOCUMENTS

| | | |
|---|---|---|
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102012008858 A1 | 11/2012 |
| DE | 102009060169 A1 | 6/2013 |
| DE | 102011080148 A1 | 7/2013 |
| DE | 102012200725 A1 | 9/2013 |
| DE | 102010034129 B2 | 10/2013 |
| DE | 102011122421 A1 | 6/2014 |
| DE | 102012222972 A1 | 6/2014 |
| DE | 102013016342 A1 | 1/2015 |
| DE | 102014009077 A1 | 2/2015 |
| DE | 102012215218 A1 | 4/2015 |
| DE | 102012222972 A1 | 5/2015 |
| DE | 102013019904 A1 | 5/2015 |
| DE | 102014007915 A1 | 12/2015 |
| DE | 102014007915 A1 | 2/2016 |
| DE | 102014011802 A1 | 2/2016 |
| DE | 102014111570 A1 | 2/2016 |
| DE | 102014015655 A1 | 4/2016 |
| DE | 102014226458 A1 | 6/2016 |
| DE | 102015209976 A1 | 12/2016 |
| DE | 102014015655 A1 | 5/2017 |
| DE | 102016011916 A1 | 6/2017 |
| DE | 102016125282 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| EP | 2135788 B1 | 6/2017 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 2004142543 A | 5/2004 |
| JP | 2004287884 A | 10/2004 |
| JP | 2005193742 A | 7/2005 |
| JP | 2004142543 A | 4/2009 |
| JP | 2016119032 A | 4/2009 |
| JP | 2004287884 A | 7/2014 |
| JP | 2014134082 A | 7/2014 |
| JP | 2016119032 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20100006714 A | 1/2010 |
| KR | 20160051993 A | 1/2010 |
| KR | 20130106005 A | 9/2013 |
| KR | 20160039460 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2011/141096 A1 | 7/2014 |
| WO | WO 2015/068032 A1 | 5/2015 |
| WO | WO 2015/193058 A1 | 12/2015 |
| WO | WO 2016/046269 A1 | 3/2016 |
| WO | WO 2015/068032 A1 | 8/2016 |
| WO | WO 2015/193058 A1 | 9/2016 |
| WO | WO 2017/062448 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/097942 A1 | 7/2017 |
| WO | WO 2017/118510 A1 | 7/2017 |

OTHER PUBLICATIONS

Alberto Broggi and Elena Cardarelli, Vehicle Detection for Autonomous Parking Using a Soft-Cascade ADA Boost Classifier, Jun. 8, 2014.

(56) References Cited

OTHER PUBLICATIONS

Automatically Into the Parking Space—https://www.mercedes-benz.com/en/mercedes-benz/next/automation/automatically-into-the-parking-space/; Oct. 27, 2014.
Bill Howard, Bosch's View of the Future Car: Truly Keyless Entry, Haptic Feedback, Smart Parking, Cybersecurity, Jan. 9, 2017, 8 Pages.
ChargeItSpot Locations, Find a Phone Charging Station Near You, retrieved at https://chargeitspot.com/locations/ on Nov. 28, 2017.
Core System Requirements Specification (SyRS), Jun. 30, 2011, Research and Innovative Technology Administration.
Daimler AG, Remote Parking Pilot, Mar. 2016 (3 Pages).
Land Rover, Land Rover Remote Control via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
SafeCharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual v2018.44. Oct. 29, 2018.
Vehicle'S Orientation Measurement Method by Single-Camera Image Using Known-Shaped Planar Object, Nozomu Araki, Takao Sato, Yasuo Konishi and Hiroyuki Ishigaki, 2010.
Land Rover develops a smartphone remote control for its SUVs, James Vincent, Jun. 18, 2015.
Al-Sherbaz, Ali et al., Hybridisation of GNSS with other wireless/sensors technologies on board smartphones to offer seamless outdoors-indoors positioning for LBS applications, Apr. 2016, 3 pages.
Jingbin Liu, IParking: An Intelligent Indoor Location-Based Smartphone Parking Service, Oct. 31, 2012, 15 pages.

\* cited by examiner

REMOTE PARK-ASSIST AUTHENTICATION FOR VEHICLES

CROSS-REFERENCE TO RELATED APPLICATIONS

This application relates to U.S. patent application Ser. No. 15/626,033 filed Jun. 16, 2017 and U.S. patent application Ser. No. 15/626,036 filed Jun. 16, 2017, both of which are incorporated by reference in their entireties.

TECHNICAL FIELD

The present disclosure generally relates to remote parking and, more specifically, remote park-assist authentication for vehicles.

BACKGROUND

Many vehicles include functions in which at least some motive functions of a vehicle are autonomously controlled by the vehicle. For example, some vehicles include cruise control in which the vehicle controls acceleration and/or deceleration of the vehicle so that a speed of the vehicle is maintained. Some vehicles also include adaptive cruise control in which the vehicle controls acceleration and/or deceleration of the vehicle so that a speed of the vehicle is maintained while also maintaining a predetermined following distance from other vehicles ahead. Further, some vehicles include park-assist features in which the vehicle autonomously controls motive functions of the vehicle to park the vehicle into a parking spot.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for remote park-assist authentication for vehicles. An example disclosed vehicle includes an autonomy unit to control motive functions for remote parking, a communication module to receive a signal for remote parking from a mobile device, and a parking authenticator. The parking authenticator is to present an image upon receiving the signal and receive, via the communication module, an audio identification from the mobile device. Also, the parking authenticator is to authenticate the mobile device to initiate remote parking in response to determining the audio identification corresponds to the image.

An example disclosed method for authenticating remote parking includes receiving, via a communication module of a vehicle, a signal for remote parking from a mobile device and presenting an image upon receiving the signal. The example disclosed method also includes receiving, via the communication module, an audio identification from the mobile device and authenticating, via a processor, the mobile device to initiate remote parking in response to determining the audio identification corresponds to the image.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
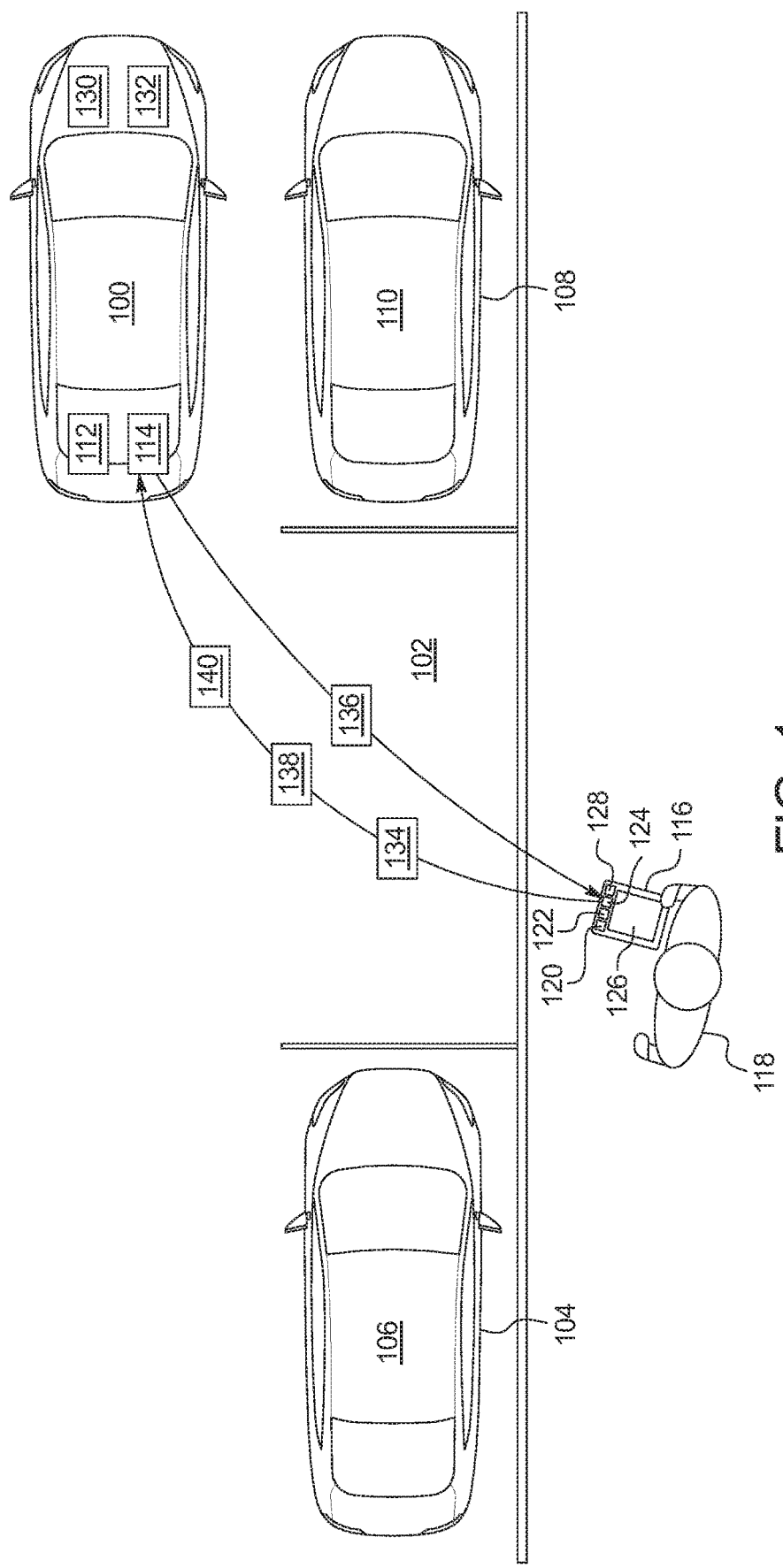
FIG. 1 illustrates an example vehicle being remotely parked in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include functions in which at least some motive functions of a vehicle are autonomously controlled by the vehicle. For example, some vehicles include cruise control in which the vehicle controls acceleration and/or deceleration of the vehicle so that a speed of the vehicle is maintained. Some vehicles also include adaptive cruise control in which the vehicle controls acceleration and/or deceleration of the vehicle so that a speed of the vehicle is maintained while also maintaining a predetermined following distance from other vehicles ahead.

Further, some vehicles include park-assist features (e.g., a remote park-assist feature) in which the vehicle autonomously controls motive functions of the vehicle to park the vehicle into a parking spot. A remote park-assist feature autonomously parks a vehicle when a driver of the vehicle has already exited the vehicle. For example, the driver may position the vehicle near a parking spot, exit the vehicle, and remotely instruct the vehicle (e.g., via a button on a key fob or mobile device) to autonomously park in the parking spot. A driver may utilize remote parking to park a vehicle in a parking spot in which a driver would subsequently be unable to exit a cabin of the vehicle (e.g., due to a nearby vehicle, wall, or other structure).

The example apparatus, methods and machine readable media disclosed herein authenticate a mobile device before enabling the mobile device to initiate remote parking of the vehicle, thereby preventing unauthorized mobile devices from potentially controlling the vehicle remotely. Example vehicles disclosed herein include an autonomy unit that autonomously controls motive functions of the vehicle during remote parking (e.g., remote park-assist) of the vehicle, a communication module (e.g., a first communication module) that receiving a signal from a mobile device of a user for remote parking the vehicle, and a parking authenticator. As used herein, "remote parking" and "remote park-assist" refer to a vehicle controlling motive functions of the vehicle without direct steering or velocity input from a driver to autonomously park the vehicle into a parking spot while the driver is located outside of the vehicle. For example, a remote park assist-system of an autonomy unit controller the motive functions of the vehicle upon initiation from a driver to remotely park the vehicle into a parking spot.

The parking authenticator presents an authentication image to the user upon receiving the signal from the mobile device. Upon viewing the authenticator image, the user is to provide an identification (e.g., an audio identification, a textual identification) of the authentication image via the mobile device. The parking authenticator receives, via the communication module, the identification of the authentication image from the mobile device and authenticates the mobile device to initiate remote parking of the vehicle via the mobile device in response to determining that the identification corresponds to the authentication image. As used herein, "to authenticate a mobile device to initiate remote parking" refers to verifying that a mobile device is permitted to instruct a vehicle to perform remote parking. For example, the parking authenticator determines that the identification corresponds to the authentication image when the identification is a word or phrase that is previously designated as corresponding to or matching the identification image. Further, in some examples, the parking authenticator includes an indicator in the authentication image that identifies a number of alphabetic characters of the identification that corresponds to the image to assist the user in providing an identification that matches the authentication image.

The parking authenticator of the examples disclosed herein retrieves the image to be presented to the user from a database upon receiving the signal from the mobile device. In some examples, the vehicle includes the database from which the parking authenticator retrieves the authentication image. Additionally or alternatively, the vehicle includes another communication module (e.g., a second communication module) to wireless communicate with a network that includes the database from which the parking authenticator retrieves the authentication image. In some examples, the user may initially provide the identification image and corresponding audio and/or textual identifications that is to be subsequently utilized for authenticating the mobile device to initiate remote parking of the vehicle. For example, prior to receiving the signal from the mobile device, the parking authenticator adds the authentication image and the corresponding identification(s) to the database upon receiving the authentication image and the identification(s) from an authorized driver. As used herein, an "authorized driver" of a vehicle refers to a person who has previously established secure communication with a vehicle and is recognized or designated by the vehicle as a driver of the vehicle.

In some examples, the parking authenticator presents the authentication image to the user via a display of the mobile device. Additionally or alternatively, the parking authenticator presents the image via an output device of the vehicle. For example, the vehicle includes a display (e.g., an adjustable display) located in a vehicle cabin, a projector that projects onto a vehicle window, and/or a projector that projects onto a ground surface adjacent the vehicle to enable the parking authenticator to present the authentication image to the user.

Further, in some examples, the parking authenticator presents an alternative authentication image for identification by the user upon receiving a request for the alternative authentication image from the user via the mobile device. Additionally or alternatively, the parking authenticator further authenticates the mobile device to initiate remote parking by receiving, via the communication module, user biometrics (e.g., a fingerprint, voice recognition, facial recognition, etc.) of the user from the mobile device and determining that the user biometrics correspond to biometrics previously submitted by an authorized driver of the vehicle. In some examples, in response to receiving a predetermined number of incorrect identifications from the mobile device that do not correspond to the authentication image, the parking authenticator locks out the mobile device from initiating remote parking for a predetermined period of time.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) or autonomous (e.g., motive functions are controlled by the vehicle 100 without direct driver input).

As illustrated in FIG. 1, the vehicle 100 is positioned to be remotely parked in an available parking spot 102. The available parking spot 102 is positioned between an occupied parking spot 104 (e.g., a first occupied parking spot) that is occupied by a parked vehicle 106 (e.g., a first parked vehicle) and another occupied parking spot 108 (e.g., a second occupied parking spot) by another parked vehicle 110 (e.g., a second parked vehicle). In the illustrated example, the available parking spot 104 is a parallel parking spot. In other examples, the available parking spot 104 into which the vehicle 102 is to park is a perpendicular or other non-parallel parking spot. In the illustrated example, the vehicle 100 is positioned next to the occupied parking spot 104 and/or the parked vehicle 106 to enable the vehicle 100 to be parallel parked in the available parking spot 102 via remote park-assist.

The vehicle 100 of the illustrated example includes an autonomy unit 112. The autonomy unit 112 is an electronic control unit (ECU) of the vehicle 100 that autonomously controls motive functions of the vehicle 100 to remotely park the vehicle 100 in available parking spots (e.g., the available parking spot 102) and/or otherwise autonomously drives the vehicle 100. For example, the autonomy unit 112 controls the motive functions of the vehicle 100 based on data collected from sensor(s) of the vehicle 100 (e.g., sensors 404 of FIG. 4).

The vehicle 100 also includes a communication module 114 (e.g., a first communication module). The communication module 114 is a short-range wireless module for wireless communication with mobile device(s) of user(s) of the vehicle 100. In the illustrated example, the communication module 114 is communicatively connected to a mobile device 116 (e.g., a smart phone, a smart watch, a wearable, a tablet, etc.) of a user 118 of the vehicle 100. The communication module 114 includes hardware and firmware to establish a connection with the mobile device 116. In some examples, the communication module 114 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. In other examples, the communication module 114 may use WiFi, WiMax, NFC, UWB (Ultra-Wide Band), and/or any other communication protocol that enables the communication module 116 to communicatively couple to the mobile device 116.

Prior to communicating with the mobile device 116, the communication module 114 authenticates the mobile device 116 for communication with the communication module 114. To authenticate communication between the communication module 114 and the mobile device 116, the communication module 114 intermittently broadcasts a beacon (e.g., a low-energy beacon such as Bluetooth® low-energy (BLE) beacon). When the mobile device 116 is within a broadcast range of the communication module 114, the mobile device 116 receives the beacon and subsequently sends a key. The communication module 114 authenticates the mobile device 116 for communication module 114 upon receiving the key from the mobile device 116.

In the illustrated example, the mobile device 116 includes a processor 120, memory 122, a communication module 124, a display 126, and a microphone 128.

The processor 120 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 122 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 122 includes multiple kinds of memory, particularly volatile memory and non-volatile memory.

The memory 122 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 122, the computer readable medium, and/or within the processor 120 during execution of the instructions.

The communication module 124 communicatively connects with other communication modules. For example, the communication module 124 is a short-range wireless module that wirelessly connects to the communication module 114 to establish communication between the mobile device 116 and the vehicle 100. The communication module 124 includes hardware and firmware to establish a connection with the communication module 114 of the vehicle 100. In some examples, the communication module 114 implements WiFi, Bluetooth® and/or Bluetooth® Low Energy (BLE) protocols.

Further, the mobile device 116 includes one or more input and/or output devices, such as the display 126 and the microphone 128. For example, the mobile device 116 presents output information (e.g., an authentication image) to the user 118 via the display 126. In some examples, the display 126 is a touch screen that tactilely receives input information (e.g., a textual identification of an authentication image) from the user 118. Further, the microphone 128 receives audio input information (e.g., an audio identification of an authentication image). Additionally or alternatively, the mobile device 116 includes other input device(s) (e.g., buttons, knobs, cameras, etc.) to receive input information from the user 118 and/or other output device(s) (e.g., a speaker) to present (e.g., audibly) output information to the user 118.

Returning to the vehicle 100 of the illustrated example, the vehicle 100 also includes another communication module 130 (e.g., a second communication module). The communication module 130 includes wired or wireless network interfaces to enable communication with external networks (e.g., an external network 418 of FIG. 4). The communication module 130 includes hardware (e.g., processors, memory, storage, antenna, etc.) and software to control the wired or wireless network interfaces. In the illustrated example, the communication module 130 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). The external network(s) may be a public network, such as the Internet; a private network, such as an intranet; or combinations thereof, and may utilize a variety of networking protocols now available or later developed including, but not limited to, TCP/IP-based networking protocols.

The vehicle 100 also includes a parking authenticator 132 that authenticates mobile devices for initiating remote parking of the vehicle 100. For example, the parking authenticator 132 determines whether to authenticate the mobile device 116 to initiate remote parking of the vehicle 100 into the available parking spot 102. For example, when the user 118 is ready to initiate remote parking of the vehicle 100, the user 118 causes the communication module 124 of the mobile device 116 to send a signal 134 (e.g., a first signal) to the vehicle 100 for remote parking the vehicle 100.

Upon receiving, via the communication module 114, the signal 134 from the mobile device 116 for remote parking the vehicle 100, the parking authenticator 132 presents an image (e.g., an image 300 of FIG. 3) to the user 118. In some examples, the parking authenticator 132 sends a signal 136 (e.g., a second signal) to the mobile device 116 to present the image to the user 118 via the display 126 of the mobile device 116. Additionally or alternatively, the parking authenticator 132 presents the image via one or more output devices of the vehicle 100 (e.g., a display 202 of FIG. 2, a projector 208 of FIG. 2, a projector 214 of FIG. 2). The parking authenticator 132 retrieves the image to be presented to the user 118 from a database and presents the image to the user 118 upon receiving the signal from the mobile device 116. In some examples, the parking authenticator 132 retrieves the image from a database (e.g., a database 416 of FIG. 4) of the vehicle 100. In some examples, the parking authenticator 132 retrieves the image from a database of a network (e.g., a database 420 of an external network 418 of FIG. 4) via the communication module 130 of the vehicle 100.

After viewing the image presented by the parking authenticator 132, the user 118 provides an identification (e.g., a word or phrase) of the image. The user 118 sends a signal 138 (e.g., a third signal) from the mobile device 116 to the parking authenticator 132 to authenticate the mobile device 116 for initiating remote parking of the vehicle 100. For example, an input device of the mobile device 116 collects the identification from the user 118, and the mobile device 116 sends the signal 138 that includes the identification to the parking authenticator 132 via the communication module 124 of the mobile device 116 and the communication module 114 of the vehicle 100. In some examples, the signal 138 includes a textual identification of the image submitted by the user 118 via input device(s) of the mobile device 116 (e.g., via the display 126 that is a touch screen). In some examples, the signal 138 includes an audio identification of the image submitted by the user 118 via the microphone 128 of the mobile device 116.

Upon receiving the identification from the mobile device 116 via the communication module 114, the parking authenticator 132 determines whether the identification provided by the user 118 corresponds to the image upon receiving the identification from the mobile device 116. For example, the parking authenticator 132 determines whether the identification corresponds to the image by comparing the word or phrase of the identification to a word or phrase that is previously designated as matching the image. In some examples in which the user 118 provides an audio identification of the image, the parking authenticator 132 compares the audio identification to an audio recording of the designated word or phrase (e.g., via speech recognition software of the parking authenticator 132) to determine whether the audio identification matches the image. In other examples in which the user 118 provides an audio identification of the image, the parking authenticator 132 compares the audio identification translates or converts the audio identification into text that the parking authenticator compares to text of the designated word or phrase to determine whether the audio identification matches the image.

In some examples, the database that includes the images also includes one or more corresponding words or phrases that correspond to the image. When the parking authenticator 132 retrieves the image from the database, the parking authenticator 132 also retrieves the corresponding word or phrase that matches the image for comparison to the identification subsequently provided by the user 118. In some examples, the database includes one or more images and corresponding identifications that are submitted by an authenticated driver (e.g., the user) of the vehicle 100 to enable the parking authenticator 132 to present personalized images to the user 118. For example, the user 118 may add a photo of her son and an audio or textual representation of his name to the database that is to be used subsequently as an image and corresponding identification, respectively, for authenticating the mobile device 116 to initiate remote parking of the vehicle 100.

In response to determining that the identification provided via the mobile device 116 corresponds to the image presented to the user 118 (e.g., a previously identified word or phrase associated with the image), the parking authenticator 132 authenticates the mobile device 116 for initiating remote parking of the vehicle 100. For example, upon the mobile device 116 being authenticated, the user 118 sends an instruction 140 via the mobile device 116 to initiate remote parking of the vehicle 100 into the available parking spot 102.

Further, in some examples, the parking authenticator 132 utilizes biometric data of the user 118 to authenticate the mobile device 116 for initiating remote parking of the vehicle 100. For example, the parking authenticator 132 may include voice recognition software that learns and is able to identify the voice of the user 118 upon the user 118 providing a number of audio identifications of images over time. Once the parking authenticator 132 learns the voice of the user 118, the user 118 may provide audio commands that enable the parking authenticator 132 to identify the user 118 and, thus, authenticate the mobile device 116 of the user 118. In such examples, the audio commands provided by the user 118 may be utilized by speech recognition software of the vehicle 100 to activate various functions of the vehicle 100. For example, when the user 118 says "RePA Start" into the microphone 128, the parking authenticator 132 authenticates the mobile device 116 via the voice recognition software and the vehicle 100 starts an engine of the vehicle 100 via the speech recognition software. When the user 118 says "RePA Unpark" into the microphone 128, the parking authenticator 132 authenticates the mobile device 116 via the voice recognition software and the vehicle 100 initiates autonomous driving via the speech recognition software to cause the vehicle 100 to exit a parking spot and/or garage.

Figure 2:
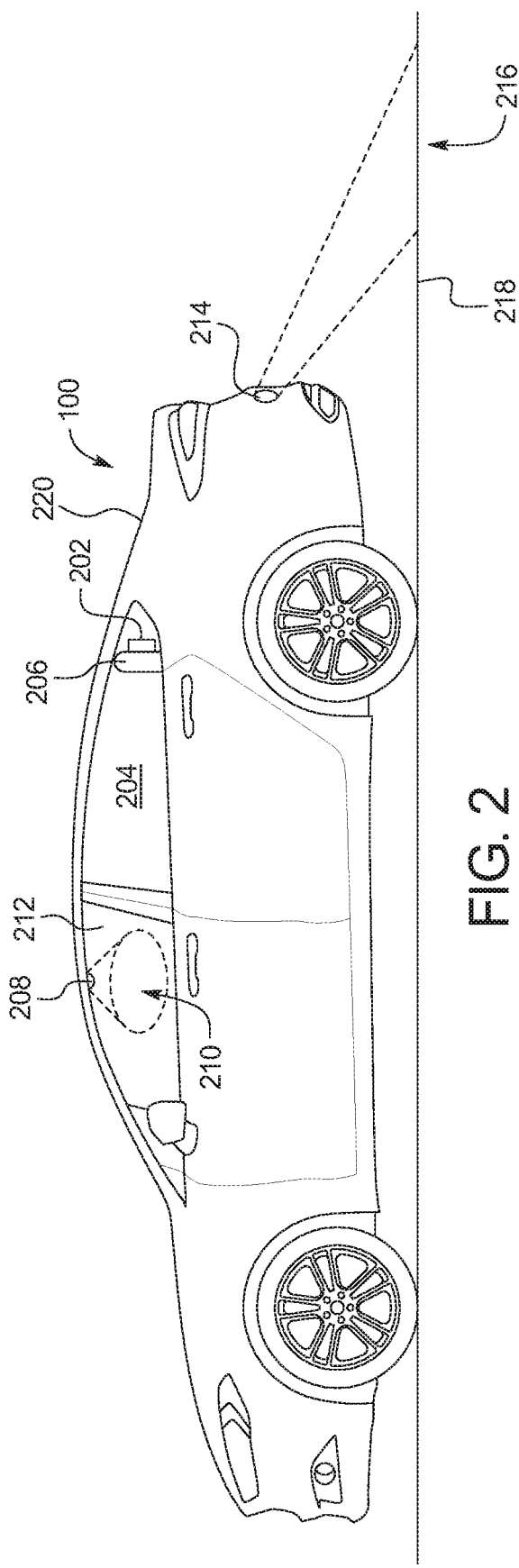
FIG. 2 is a side view of the vehicle of FIG. 1.

FIG. 2 is a side view of the example vehicle 100. In the illustrated example, the vehicle 100 includes a plurality of output devices for presenting an image (e.g., an image 300 of FIG. 3) to the user 118 for identification. For example, the parking authenticator 132 presents images to the user 118 via one or more of the plurality of output devices to enable the mobile device 116 to be authenticated for initiating remote parking of the vehicle 100. While the vehicle 100 of the illustrated example includes three output devices for presenting images to the user 118, the vehicle 100 may include more or less output devices for presenting those images.

As illustrated in FIG. 2, the vehicle 100 includes a display 202 located within a cabin 204 of the vehicle 100. The display 202 may be a liquid crystal display (LCD), an organic light emitting diode (OLED) display, a flat panel display, a solid state display, and/or any other type of display that enables the parking authenticator 132 to present the image to the user 118. In the illustrated example, the display 202 is located on a rear seat 206 of the vehicle 100. In other examples, the display 202 may be located on another seat (e.g., a front seat) and/or any other surface within the cabin 204. Additionally or alternatively, the vehicle 100 may include a plurality of displays that are located throughout the cabin 204 of the vehicle 100 to enable the user 118 to view the image from a plurality of positions relative to the vehicle 100. Further, in some examples, the display 202 is adjustable such that the parking authenticator 132 adjusts a position and/or an orientation of the display 202 within the cabin 204 prior to and/or while presenting the image via the display 202 to enable the display 202 to present the image to the user 118 at various positions relative to the vehicle 100.

In the illustrated example, the vehicle 100 also includes a projector 208 (e.g., a first projector) located within the cabin 204 of the vehicle 100 that projects a projection 210 (e.g., a first projection) onto a window 212 of the vehicle 100. For example, the projection 210 presented via the projector 208 includes the image utilized for authenticating the mobile device 116 to enable the user 118 to view the image when positioned a distance away from the vehicle 100. In the illustrated example, the window 212 onto which the projection 210 is displayed is a front passenger-side window of the vehicle 100. Additionally or alternatively, the projector 208 displays the projection 210 onto one or more other windows of the vehicle 100 (e.g., a front driver-side window, a rear window, etc.) to view the image from multiple positions relative to the vehicle 100.

Further, the vehicle 100 of the illustrated example also includes a projector 214 (e.g., a second projector) that projects a projection 216 (e.g., a second projection) onto a ground surface 218 adjacent to the vehicle 100. The projection 216 presented via the projector 214 includes the image utilized for authenticating the mobile device 116 to enable the user 118 to view the image when positioned a distance away from the vehicle 100. In the illustrated example, the projector 214 is located on an outer surface 220 of the vehicle 100. In other examples, the projector 214 is located within the cabin 204 and projects the projection 216 through a window (e.g., the window 212) of the vehicle 100. While the projection 216 of the illustrated example is located on the ground surface 218, the projector 214 may project the projection 216 onto any other surface adjacent to the vehicle 100.

Figure 3:
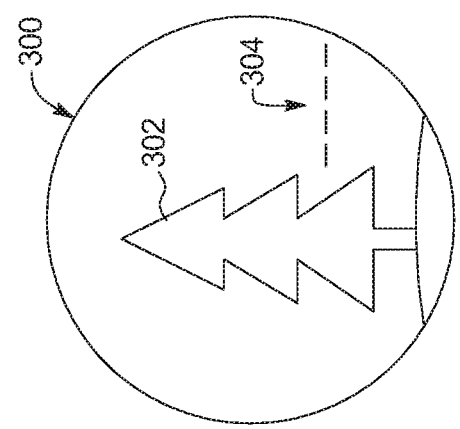
FIG. 3 is an example image presented to authenticate a mobile device for remote parking of the vehicle of FIGS. 1 and 2.

FIG. 3 depicts an example image 300 that the parking authenticator 132 presents to the user 118 for authenticating the mobile device 116 to initiate remote parking of the vehicle 100. For example, the image 300 is displayed for the user 118 via the display 126 of the mobile device 116, the display 202 of the vehicle 100, the projector 208 of the vehicle 100, and/or the projector 214 of the vehicle 100 to enable the user to identify and provide an identification of the image 300. As illustrated in FIG. 3, the image 300 includes an object 302 that the user 118 is to identify. For example, upon presenting the object 302, the parking authenticator 132 authenticates the mobile device 116 for initiating remote parking of the vehicle 100 in response to the user 118 providing an audio or textual identification of "tree." In some examples, there are a plurality of words or phrases that are designated to match the image 300. For example, the parking authenticator 132 also may authenticate the mobile device 116 in response to the user 118 providing an identification of "pine," "pine tree," or "Christmas tree."

In some examples, the parking authenticator 132 includes or inserts an indicator 304 in the image 300 that identifies a number of alphabetic characters of the designated word or phrase that corresponds to the image 300 to assist the user 118 in providing the identification of the image 300. In the illustrated example, the indicator 304 includes four characters. Thus, upon the user 118 viewing the image 300, the indicator 304 informs assists the user 118 in determining which potential words or phrases the parking authenticator 132 will identify as corresponding to the image (e.g., "tree" and "pine" include four characters) and which potential words or phrases the parking authenticator 132 will identify as not corresponding to the image (e.g., "pine tree" and "Christmas tree" do include four characters).

Figure 4:
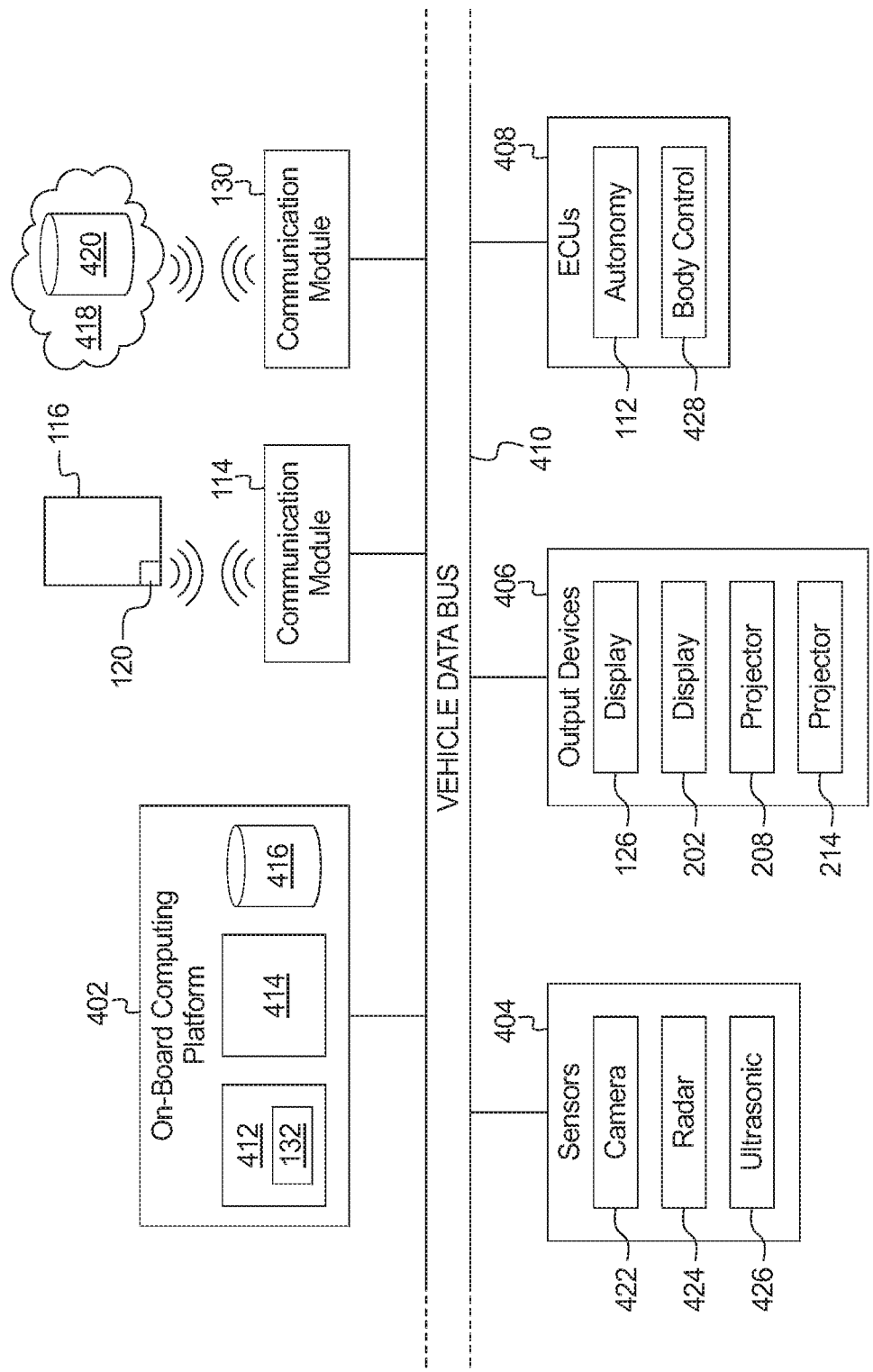
FIG. 4 is a block diagram of electronic components of the vehicle of FIGS. 1 and 2.

FIG. 4 is a block diagram of electronic components 400 of the vehicle of FIGS. 1 and 2. As illustrated in FIG. 4, the electronic components 400 include an on-board computing platform 402, the communication module 114. the communication module 130, sensors 404, output devices 406, electronic control units 408, and a vehicle data bus 410.

The on-board computing platform 402 includes a microcontroller unit, controller or processor 412; memory 414; and a database 416. In some examples, the processor 412 of the on-board computing platform 402 is structured to include the example parking authenticator 132. Alternatively, in some examples, the example parking authenticator 132 is incorporated into another electronic control unit (ECU) with its own processor 412, memory 414, and/or database 416. In some examples, the database 416 stores images and corresponding identification words or phrases that are retrieved by the parking authenticator 132 to authenticate the mobile device 116 for remotely parking the vehicle 100.

Further, the processor 412 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 414 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 414 includes multiple kinds of memory, particularly volatile memory and non-volatile memory.

The memory 414 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 414, the computer readable medium, and/or within the processor 412 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

As illustrated in FIG. 4, the communication module 114 of the vehicle 100 communicatively connects (e.g., wirelessly) to the communication module 124 of the mobile device 116. For example, the communication module 114 and the communication module 124 are communicatively connected to enable the mobile device 116 to send the signal for remote parking to the vehicle 100; the parking authenticator 132 to present the image 300 via the display 126 of the mobile device 116; the mobile device 116 to send the audio identification, textual identification, and/or user biometrics (e.g., biometrics of the user 118) to the parking authenticator 132; and/or the mobile device 116 to initiate remote parking of the vehicle 100.

Further, the communication module 130 of the illustrated example communicatively connects (e.g., wirelessly) to an external network 418. The external network 418 may be a public network, such as the Internet; a private network, such as an intranet; or combinations thereof, and may utilize a variety of networking protocols now available or later developed including, but not limited to, TCP/IP-based networking protocols. The external network 418 of the illustrated example includes a database 420. In some examples, the database 416 stores images and corresponding identification words or phrases that are retrieved by the parking authenticator 132 via the communication module 130 to authenticate the mobile device 116 for remotely parking the vehicle 100.

The sensors 404 are arranged in and around the vehicle 100 to monitor properties of the vehicle 100 and/or an environment in which the vehicle 100 is located. One or more of the sensors 404 may be mounted to measure properties around an exterior of the vehicle 100. Additionally or alternatively, one or more of the sensors 404 may be mounted inside a cabin of the vehicle 100 or in a body of the vehicle 100 (e.g., an engine compartment, wheel wells, etc.) to measure properties in an interior of the vehicle 100. For example, the sensors 404 include accelerometers, odometers, tachometers, pitch and yaw sensors, wheel speed sensors, microphones, tire pressure sensors, biometric sensors and/or sensors of any other suitable type. In the illustrated example, the sensors 404 include a camera 422, a RADAR sensor 424, and an ultrasonic sensor 426. For example, the camera 422 obtains image(s) and/or video to enable detection and location of nearby object(s), the RADAR sensor 424 detects and locates the nearby object(s) via radio waves, and/or the ultrasonic sensor 426 detects and locates the nearby object(s) via ultrasound waves to enable the autonomy unit 112 to autonomously park the vehicle 100 into the available parking spot 102.

The output devices 406 are utilized by the parking authenticator 132 to present the image 300 that is to be identified by the user 118 to authenticate the mobile device 116 for remote parking the vehicle 100. The output devices 406 may include a heads-up display, a center console display (e.g., a liquid crystal display (LCD), an organic light emitting diode (OLED) display, a flat panel display, a solid state display, etc.), and/or projectors. For example, the output devices 406 include the display 126 of the mobile device 116 and the display 202, the projector 208, and the projector 214 of the vehicle 100.

The ECUs 408 monitor and control the subsystems of the vehicle 100. For example, the ECUs 408 are discrete sets of electronics that include their own circuit(s) (e.g., integrated circuits, microprocessors, memory, storage, etc.) and firmware, sensors, actuators, and/or mounting hardware. The ECUs 408 communicate and exchange information via a vehicle data bus (e.g., the vehicle data bus 410). Additionally, the ECUs 408 may communicate properties (e.g., status of the ECUs 408, sensor readings, control state, error and diagnostic codes, etc.) to and/or receive requests from each other. For example, the vehicle 100 may have seventy or more of the ECUs 408 that are positioned in various locations around the vehicle 100 and are communicatively coupled by the vehicle data bus 410. In the illustrated example, the ECUs 408 include the autonomy unit 112 and a body control module 428. For example, the body control module 428 controls one or more subsystems throughout the vehicle 100, such as power windows, power locks, an immobilizer system, power mirrors, etc. For example, the body control module 428 includes circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 410 communicatively couples the communication module 114, the communication module 130, the on-board computing platform 402, the sensors 404, the output devices 406, and the ECUs 408. In some examples, the vehicle data bus 410 includes one or more data buses. The vehicle data bus 410 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 5:
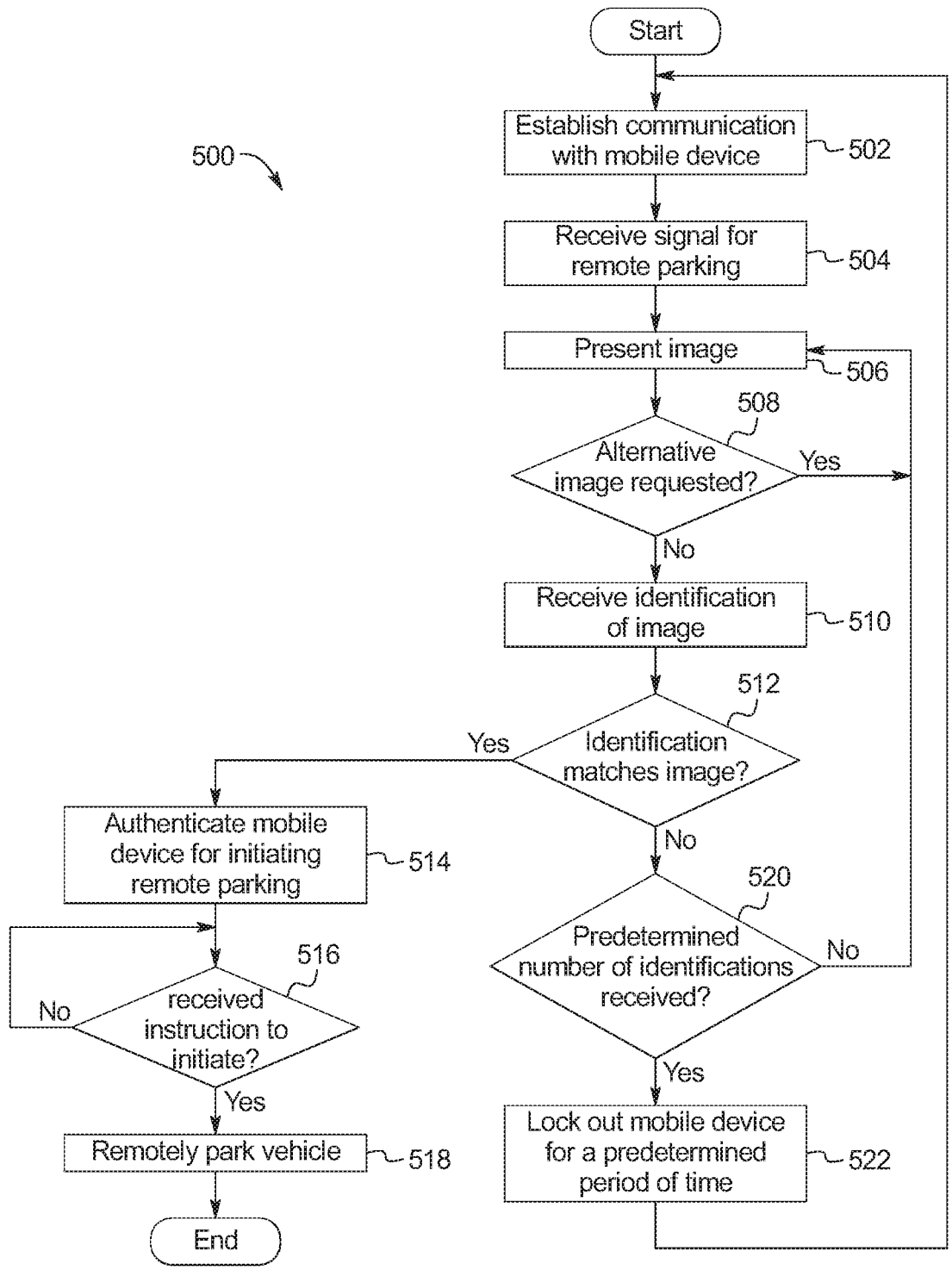
FIG. 5 is a flowchart for authenticating a user to remotely park the vehicle of FIGS. 1 and 2 in accordance with the teachings herein.

FIG. 5 is a flowchart of an example method 500 to authenticate a user to remotely park a vehicle. The flowchart of FIG. 5 is representative of machine readable instructions that are stored in memory (such as the memory 414 of FIG. 4) and include one or more programs which, when executed by a processor (such as the processor 412 of FIG. 4), cause the vehicle 100 to implement the example parking authenticator 132 of FIGS. 1 and 4. While the example program is described with reference to the flowchart illustrated in FIG. 5, many other methods of implementing the example parking authenticator 132 of FIGS. 1 and 4 may alternatively be used. For example, the order of execution of the blocks may be rearranged, changed, eliminated, and/or combined to perform the method 500. Further, because the method 500 is disclosed in connection with the components of FIGS. 1-4, some functions of those components will not be described in detail below.

Initially, at block 502, the communication module 114 of the vehicle 100 establishes communication with the mobile device 116 of the user 118. At block 504, the communication module 114 receives the signal 134 from the mobile device 116 for remote parking the vehicle 100. For example, parking authenticator 132 receives, via the communication module 114, the signal 134 when the user 118 is outside the cabin 204 of the vehicle 100 and positioned nearby the available parking spot 102.

Upon receiving the signal 134, the parking authenticator 132 presents the image 300 for identification by the user 118 (block 506). For example, the parking authenticator 132 sends the signal 136 to the mobile device 116 to present the image 300 to the user 118 via the display 126 of the mobile device 116. Additionally or alternatively, the parking authenticator 132 presents the image 300 to the user 118 via the display 202, the projector 208, and/or the projector 214 of the vehicle 100. In some examples, the parking authenticator 132 includes or inserts the indicator 304 in the image 300 to facilitate the user 118 in identifying the image 300. Further, in some examples, the parking authenticator 132 retrieves the image 300 from a database (e.g., the database 416 or the database 420 of FIG. 4) upon receiving the signal 134 from the mobile device 116. The database may include one or more images and corresponding identifications that are previously submitted by an authenticated driver (e.g., the user 118) of the vehicle 100 to enable the parking authenticator 132 to present personalized images to the user 118. For example, prior to receiving the signal 134 from the mobile device 116, the parking authenticator 132 adds personalized images (e.g., an image of a son of the user 118) and a corresponding audio or textual identification (e.g., the son's name) that are submitted by the user 118.

At block 508, the parking authenticator 132 determines whether the user 118 has requested for an alternative image (e.g., an image different than that of the image 300) to be presented. For example, the user 118 may request for an alternative image to be presented if the user 118 is unable to identify the image (e.g., the image 300) previously presented by the parking authenticator 132. In response to receiving a request for an alternative image, the method 500 returns to block 506 at which the parking authenticator 132 presents the alternative image to the user 118.

When a request for an alternative image is not received, the method proceeds to block 510 at which the parking authenticator 132 receives an identification of the image 300 from the mobile device 116. In some examples, the parking authenticator 132 receives an audio identification that is collected from the user 118 via the microphone 128 of the mobile device 116. In other examples, the parking authenticator 132 receives a textual identification that is collected from the user 118 via another input device (e.g., a touch screen such as the display 126) of the mobile device 116. At block 512, the parking authenticator 132 determines whether the identification of the user 118 corresponds to the image 300. For example, the parking authenticator 132 compares a word or phrase of the identification to word(s) or phrase(s) previously designated as corresponding to the image 300.

In response to determining that the identification received from the mobile device 116 of the user 118 is correct (i.e., matches a word or phrase previously designated as corresponding to the image 300), the method 500 proceeds to block 514 at which the parking authenticator 132 authenticates the mobile device 116 to initiate remote parking of the vehicle 100. In some examples, authenticating the mobile device 116 to initiate remote parking further includes determining whether the user 118 is an authorized driver of the vehicle 100. To determine whether the user 118 is an authorized driver, the parking authenticator 132 receives, via the communication module 114 and the communication module 124, user biometrics of the user 118 that is collected via the mobile device 116. For example, the user biometrics include fingerprint analysis, voice recognition, and/or facial recognition that are based on fingerprint samples, audio recordings, and images, respectively, collected by input devices of the mobile device 116. The parking authenticator 132 authenticates the mobile device 116 of the user 118 in response to determining that the user biometrics of the user 118 corresponds to a previously authorized driver of the vehicle 100.

At block 516, the parking authenticator 132 determines whether the vehicle 100 has received the instruction 140 from the mobile device 116 to initiate remote parking of the vehicle 100. In response to determining that the instruction 140 has not been received, the method 500 remains at block 516. In response to determining that the instruction 140 has been received, the method 500 proceeds to block 518 at which the autonomy unit 112 controls the motive functions of the vehicle 100 to remotely park the vehicle 100 in the occupied parking spot 104. Upon the autonomy unit 112 parking the vehicle 100 in the available parking spot 102, the method 500 ends.

Returning to block 512, in response to determining that the identification received from the mobile device 116 of the user 118 is incorrect (i.e., does not match a word or phrase previously designated as corresponding to the image 300), the method 500 proceeds to block 520. At block 520, the parking authenticator 132 determines whether the a predetermined number (e.g., 3, 5, etc.) of consecutive incorrect identifications has been received from the user 118. In response to determining that the predetermined number of incorrect identifications has been received, the parking authenticator 132 locks out the mobile device 116 to prevent the mobile device 116 from initiating remote parking of the vehicle 100 for a predetermined period of time (e.g., 15 minutes) (block 522). Upon locking out the mobile device 116, the method 500 returns to block 502. Otherwise, in response to determining at block 520 that the predetermined number of incorrect identifications has not been received, the method 500 returns to block 506 at which the parking authenticator 132 enables the user 118 to again attempt to authenticate the mobile device 116 for initiating remote parking of the vehicle 100. In some examples, the parking authenticator 132 presents the same image 300 that was previously presented to the user 118. In other examples, the parking authenticator 132 presents an alternative image to the user.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   an autonomy unit to control motive functions for remote parking;
   a communication module to receive a signal for remote parking from a mobile device; and
   a controller configured to:
      present an image upon receiving the signal;
      receive, via the communication module, audio identification from the mobile device;
      authenticate the mobile device to initiate remote parking in response to determining the audio identification corresponds to the image; and
      include an indicator in the image for authenticating the mobile device that identifies a number of alphabetic characters of the audio identification that corresponds to the image.

2. The vehicle of claim 1, further including a display located in a vehicle cabin, wherein the controller is configured to present the image for authenticating the mobile device via the display located in the vehicle cabin.

3. The vehicle of claim 2, wherein the controller is configured to adjust at least one of a position and an orientation of the display prior to presenting the image for authenticating the mobile device via the display.

4. The vehicle of claim 1, further including a window and a projector, wherein the controller is configured to project the image for authenticating the mobile device onto the window via the projector.

5. The vehicle of claim 1, further including a projector, wherein the controller is configured to project the image for authenticating the mobile device onto a ground surface via the projector.

6. The vehicle of claim 1, wherein the controller is configured to instruct the mobile device to present the image for authenticating the mobile device via a display of the mobile device.

7. The vehicle of claim 1, wherein the controller is configured to retrieve the image for authenticating the mobile device from a database.

8. The vehicle of claim 7, further including the database from which the controller is configured to retrieve the image for authenticating the mobile device.

9. The vehicle of claim 7, further including a second communication module in wireless communication with a network that includes the database, wherein the controller is configured to retrieve the image for authenticating the mobile device from the database via the second communication module.

10. The vehicle of claim 1, wherein the controller further is configured to authenticate the mobile device to initiate remote parking in response to receiving a textual identification from the mobile device and determining that the textual identification corresponds to the image.

11. The vehicle of claim 1, wherein the controller is configured to:
receive, via the communication module, user biometrics from the mobile device; and
authenticate the mobile device in response to identifying the user biometrics correspond to biometrics of an authorized driver.

12. The vehicle of claim 11, wherein the user biometrics includes at least one of a fingerprint, voice recognition, and facial recognition.

13. A method for authenticating remote parking, the method comprising:
receiving, via a communication module of a vehicle, a signal for remote parking from a mobile device;
presenting an image upon receiving the signal;
receiving, via the communication module, an audio identification from the mobile device;
authenticating, via a processor, the mobile device to initiate remote parking in response to determining the audio identification corresponds to the image; and
inserting an indicator into the image that identifies a number of alphabetic characters of the audio identification that corresponds to the image.

14. The method of claim 13, further including locking out the mobile device from initiating remote parking for a predetermined period of time in response to receiving a predetermined number of audio identifications from the mobile device that do not correspond to the image.

15. The method of claim 13, further including presenting an alternative image for identification upon receiving a request for the alternative image.

16. The method of claim 13, further including:
receiving, via the communication module, user biometrics from the mobile device, the user biometrics includes at least one of a fingerprint, voice recognition, and facial recognition; and
authenticating the mobile device in response to identifying the user biometrics correspond to biometrics of an authorized driver.

17. The method of claim 13, further including retrieving the image from a database upon receiving the signal and prior to presenting the image.

18. The method of claim 17, further including adding the image and the audio identification to the database upon receiving the image and the audio identification corresponding to the image from an authorized driver.

19. A vehicle comprising:
an autonomy unit to control motive functions for remote maneuver;
a communication module to receive a signal for remote maneuver from a mobile device; and
a controller configured to:
present an image upon receiving the signal;
receive, via the communication module, audio identification from the mobile device;
authenticate the mobile device to initiate remote maneuver in response to determining the audio identification corresponds to the image; and
include an indicator in the image for authenticating the mobile device that identifies a number of alphabetic characters of the audio identification that corresponds to the image.

\* \* \* \* \*